(12) United States Patent
Pallares et al.

(10) Patent No.: US 10,843,184 B2
(45) Date of Patent: Nov. 24, 2020

(54) METHOD FOR MANUFACTURING A LEAKTIGHT CONTAINER

(71) Applicant: SARTORIUS STEDIM ASEPTICS, Lourdes (FR)

(72) Inventors: Alain Pallares, La Bouilladisse (FR); Mathieu Labedan, Leognan (FR)

(73) Assignee: SARTORIUS STEDIM ASEPTICS, Lourdes (FR)

( * ) Notice: Subject to any disclaimer, the term of this patent is extended or adjusted under 35 U.S.C. 154(b) by 148 days.

(21) Appl. No.: 16/061,760

(22) PCT Filed: Dec. 22, 2016

(86) PCT No.: PCT/FR2016/053624
§ 371 (c)(1),
(2) Date: Jun. 13, 2018

(87) PCT Pub. No.: WO2017/109420
PCT Pub. Date: Jun. 29, 2017

(65) Prior Publication Data
US 2018/0369801 A1 Dec. 27, 2018

(30) Foreign Application Priority Data
Dec. 23, 2015 (FR) ...................... 15 63162

(51) Int. Cl.
*B01L 1/02* (2006.01)
*B25J 21/02* (2006.01)
(52) U.S. Cl.
CPC ............... *B01L 1/02* (2013.01); *B25J 21/02* (2013.01); *B01L 2200/025* (2013.01); *B01L 2300/123* (2013.01)

(58) Field of Classification Search
CPC ............. B01L 1/02; B01L 2300/123; B01L 2200/025; B25J 21/02
See application file for complete search history.

(56) References Cited

U.S. PATENT DOCUMENTS 2,794,574 A * 6/1957 McGeorge ............. B29D 23/20
222/92
4,425,177 A * 1/1984 Shinno ...................... A61J 1/10
156/272.2

(Continued)

FOREIGN PATENT DOCUMENTS

| EP | 0 688 020 | 12/1995 |
| FR | 2 721 289 | 12/1995 |
| FR | 2 951 516 | 4/2011 |

OTHER PUBLICATIONS

International Search Report, PCT/FR2016/053624, dated Feb. 17, 2017.

*Primary Examiner* — Thomas M Wittenschlaeger
(74) *Attorney, Agent, or Firm* — Nixon & Vanderhye

(57) ABSTRACT

Disclosed is a method for manufacturing a leaktight assembly by providing a bag, a connection system including a connector adapted for mechanical connection to a complementary connector of a sterile chamber in order to establish sterile communication between the bag and the chamber, the connector including a portion for attachment to the bag, the connection system further including an overmolding molded over the attachment portion, the manufacturing method further including the steps of positioning the wall of the bag facing the overmolding at a first access opening of the bag, the attachment portion surrounding a space for passage between the bag and the chamber at the first access opening, and welding the wall of the bag onto the overmolding.

18 Claims, 6 Drawing Sheets

(56) References Cited

U.S. PATENT DOCUMENTS

| | | | | |
|---|---|---|---|---|
| 5,002,623 A * | 3/1991 | Steer | ............... | A61F 5/4404 |
| | | | | 156/221 |
| 5,593,066 A * | 1/1997 | Konuma | ........... | B05C 17/00506 |
| | | | | 222/94 |
| 5,647,510 A * | 7/1997 | Keller | ............... | B05C 17/00513 |
| | | | | 222/94 |
| 5,853,207 A * | 12/1998 | Saint Martin | ............. | B01L 1/02 |
| | | | | 292/256.6 |
| 6,553,722 B1 * | 4/2003 | Porret | ............... | B01L 1/02 |
| | | | | 49/507 |
| 6,591,662 B1 * | 7/2003 | Grimard | ............... | B01L 1/02 |
| | | | | 73/46 |
| 7,194,847 B2 * | 3/2007 | Summons | ......... | B05C 17/00596 |
| | | | | 53/433 |
| 7,913,877 B2 * | 3/2011 | Neuhalfen | ............. | B65D 83/62 |
| | | | | 222/402.1 |
| 9,283,556 B2 * | 3/2016 | Armau | ............... | B01L 1/02 |
| 9,314,787 B2 * | 4/2016 | Porret | ............... | B01L 1/02 |
| 9,517,488 B2 * | 12/2016 | Frey | ................ | B05C 17/00559 |
| 9,545,628 B2 * | 1/2017 | Armau | ............... | B01L 3/54 |
| 2005/0168117 A1 * | 8/2005 | Porret | ............... | B01L 1/02 |
| | | | | 312/291 |
| 2012/0267367 A1 * | 10/2012 | Armau | ............... | F16J 13/02 |
| | | | | 220/23.83 |
| 2013/0158637 A1 * | 6/2013 | Sheikh | ............... | A61F 7/103 |
| | | | | 607/114 |
| 2014/0174037 A1 * | 6/2014 | Frey | ............... | B65D 81/325 |
| | | | | 53/467 |

* cited by examiner

US 10,843,184 B2

METHOD FOR MANUFACTURING A LEAKTIGHT CONTAINER

The present invention relates to leaktight containers in the pharmaceutical or biotechnology field.

More particularly, the invention relates to leaktight containers used in leaktight assemblies between a sterile chamber such as an isolator and one or more of said containers. In this field, it is known to use a sterile chamber comprising a plurality of doors, and to connect containers at these doors which are themselves fitted with doors. The doors are opened after connecting the sterile chamber and the external container, to allow the transfer of objects contained in the container to the sterile chamber or even in the opposite direction where appropriate.

BACKGROUND OF THE INVENTION

Already commonly known are methods for manufacturing leaktight containers for biopharmaceutical applications, such as the container disclosed in FR 2721289. In particular, this involves mounting a leaktight assembly by assembling a bag comprising a wall and an opening for accessing a connector provided with a door, the other access opening of the bag being intended to be closed. A known mode of manufacturing such an assembly for such a container is by inserting the thickness of the bag wall at its access opening between the connector and a complementary part which then clamps the preceding assembly. However, this type of container is intended for exposure to high stresses, and the risk still exists of leakage at the assembly or of weakening the material of the bag which can ultimately lead to bursting. There is therefore a desire to reduce such risks for the increasingly demanding applications of the biopharmaceutical field.

The search for another solution to ensure a better seal has led to considering an assembly by welding between the bag and the connector. However, such an assembly method poses a problem concerning the usual constituent materials of these components, which are not sufficiently compatible for a welded assembly to be possible (temperature resistance) and guarantee better performance.

An alternative solution to these methods for manufacturing leaktight assemblies is therefore sought.

SUMMARY OF THE INVENTION

For this purpose, in the method for manufacturing a leaktight assembly according to the invention: a bag comprising a wall of flexible film is provided, the wall of said bag defining an internal volume of said bag, said bag having two opposite ends, a first access opening at the first end adapted for placing the internal volume of the bag in communication with the outside of the bag, a second access opening at the second end adapted for placing the internal volume of the bag in communication with the outside of the bag; a connection system is provided, the connection system comprising a connector adapted for mechanical connection to a complementary connector of a sterile chamber in order to establish a sterile communication between the bag and the chamber, the connector comprising a portion for attachment to the bag, the connection system further comprising an overmolding molded over the attachment portion; the manufacturing method further comprising the steps of positioning the wall of the bag facing the overmolding at the first access opening, the attachment portion surrounding a space for passage between the bag and the chamber at said first access opening, welding the wall of the bag to the overmolding in a closed continuous manner all along the first access opening.

In such a manufacturing method, the overmolding, selected in a suitable material, allows welding the wall of the bag to said overmolding in order to create a good seal for the container so produced. In addition, the leaktight container so produced can be sterilized with steam or gamma irradiation.

In various embodiments of the method for manufacturing a leaktight assembly according to the invention, one or more of the following arrangements may possibly be used:

said connector comprises a radially outer surface directed radially outward of the connector, the overmolding comprises a radially inner surface and a radially outer surface opposite to the radially inner surface of the overmolding, the bag comprises an inner surface facing towards the internal volume, the radially outer surface of the connector facing the radially inner surface of the overmolding, such that during the step of positioning the overmolding to face the wall of the bag, the radially outer surface of the overmolding is also positioned facing the inner surface of the bag;

the method further comprises a step of obtaining the overmolding, wherein a molding member adapted to at least partially surround the attachment portion is provided, a molding product suitable for welding the wall of flexible film of the bag to said product is provided, the method including the steps of at least partially surrounding the attachment portion of the connector by the molding member so as to define a closed cavity between the attachment portion and the molding member, pouring the molding product into the cavity between the attachment portion and the molding member, removing the molding member, freeing the overmolding over at least a portion of the attachment portion;

the connector is of polyvinylidene fluoride and the overmolding is of high density polyethylene or thermoplastic elastomer;

the connector is of polycarbonate or acrylonitrile butadiene styrene (ABS) and the overmolding is of high density polyethylene or thermoplastic elastomer;

the connector is of polybutylene terephthalate and the overmolding is of high density polyethylene or polyvinylidene fluoride;

the wall of the bag is of plastic film;

the plastic film comprises a layer of polyethylene;

a layer of plastic film which faces the overmolding is a layer of polyethylene.

In addition, the invention relates to a method for manufacturing a leaktight container further comprising a step of filling the bag by the second access opening, and a step of closing the second access opening of the bag so as to close the bag in a leaktight manner at its second access opening after closing the assembly in a leaktight manner at the connector, and filling the bag.

In various embodiments of the method for manufacturing a leaktight container according to the invention, one or more of the following arrangements may also possibly be used:

the closing step consists of assembling a closing surface to the wall of the bag, the closing surface being adapted for attachment to the wall of the bag at its second access opening;

the closing step consists of welding the wall of the bag to itself at its second access opening.

In addition, the invention relates to a leaktight assembly comprising: a bag comprising a wall of flexible film, the wall of said bag defining an internal volume of said bag, said bag having two opposite ends, a first access opening adapted for placing the internal volume of the bag in communication with the outside of the bag at the first end, a second access opening adapted for placing the internal volume of the bag in communication with the outside of the bag at the second end; a connection system, the connection system comprising a connector adapted for mechanical connection to a complementary connector of a sterile chamber in order to establish a sterile communication between the bag and the chamber, the connector comprising a portion for attachment to the bag, the connection system further comprising an overmolding molded over the attachment portion; the wall of the bag being positioned facing the overmolding at the first access opening, the attachment portion surrounding a space for passage between the bag and the chamber at the first access opening, the wall of the bag being welded to the overmolding in a closed continuous manner all along the first access opening.

In various embodiments of the leaktight assembly according to the invention, one or more of the following arrangements may possibly also be employed:
the attachment portion has an annular shape and the overmolding forms a ring around the attachment portion;
the connector comprises a door adapted to equip the access opening of the bag, the door comprising a flange-shaped frame, the attachment portion being at least a portion of the flange;
the attachment portion of the connector comprises a body and a projecting member, the projecting member extending radially from said body, said projecting member being encapsulated in the overmolding.

In addition, the invention relates to a leaktight container comprising a leaktight assembly, the second access opening being closed in a leaktight manner.

In various embodiments of the method for manufacturing a leaktight container according to the invention, one or more the following arrangements may further be employed:
the second access opening is closed in a leaktight manner;
the second access opening is closed by a closing surface, the closing surface being adapted for attachment to the wall of the bag at its second access opening;
the second access opening is closed by welding the wall of the bag to itself at its second access opening;

In addition, the invention relates to a leaktight assembly comprising a container wherein the connector is a first connector, the leaktight assembly further comprising a rigid chamber comprising a second connector complementary to the first connector, the connector of the leaktight container being connected in a leaktight manner to the second connector of said rigid chamber.

Other features and advantages of the invention will be apparent from the following description of one of its embodiments, given by way of non-limiting example and with reference to the accompanying drawings.

DETAILED DESCRIPTION OF THE PREFERRED EMBODIMENTS

Figure 1A:
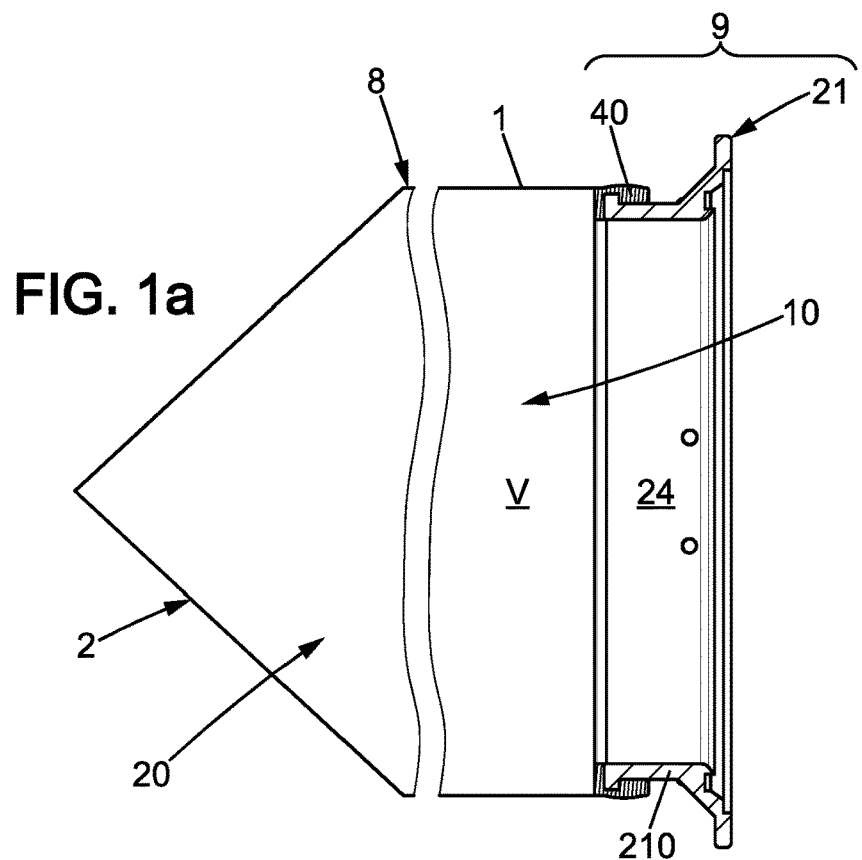
FIGS. 1a and 1b illustrate the leaktight container in the case where the bag is welded and in the case where a closing surface is mounted.

The present invention relates to leaktight containers and to their manufacturing for pharmaceutical or biotechnological applications requiring limited or no contamination, including by particles from the external environment.

This typically involves a bag whose contents are to be isolated from the external environment, assembled to another chamber such as an isolator, for a sterile transfer between the bag and the chamber. A typical application would be to use such a container for the sterile transfer of packaging material or syringe stoppers from a bag within which they are initially contained and sterilized, to an isolator.

FIG. 1 shows a leaktight container. Said container comprises a leaktight assembly of which the second access opening 20 is closed in a leaktight manner.

More specifically, the leaktight assembly comprises a bag 1 comprising a wall 8 of flexible film, the wall 8 of said bag defining an internal volume V of said bag, said bag 1 having two opposite ends, a first access opening 10 adapted for placing the internal volume of the bag in communication with the outside of the bag at the first end, a second access opening 20 adapted for placing the internal volume of the bag in communication with the outside of the bag at the second end. The container also comprises a connection system 9 which includes a connector 21 comprising an attachment portion 210 and an overmolding 40 molded on the attachment portion 210. The wall of the bag is positioned facing the overmolding at the first access opening 10, the wall of the bag being welded to the overmolding 40. The second access opening 20 of said bag 1 is closed in a leaktight manner.

Said assembly may be closed in a leaktight manner at the connector 21.

Said assembly may in particular be connected to a complementary connector of a sterile chamber, such an assembly between the connectors enabling a sterile communication between the contents of the bag 1 and the chamber 11. The attachment portion 210 is located at the access opening of the bag 1 and surrounds a space for passage 24 between the bag 1 and the chamber 11 at the access opening 10. The assembly thus formed may for example be removable and transportable, for example for one-time use, the assembly being small and the bag being flexible, which reduces the space requirements for transport and delivery of these containers.

Figure 1B:
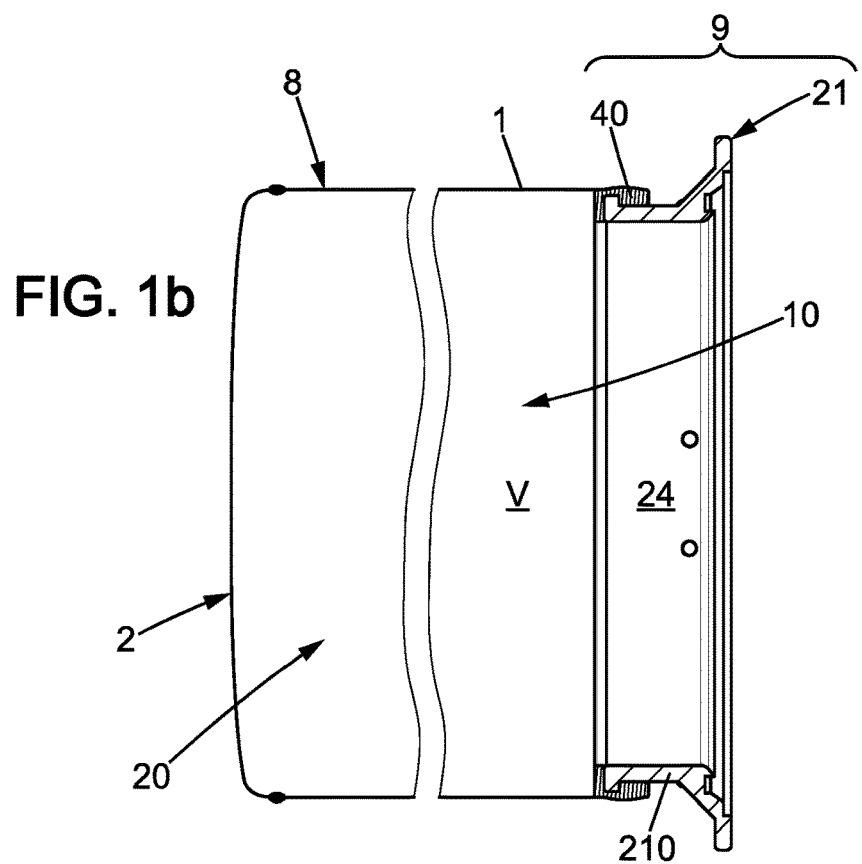

The second access opening 20 is then closed in a leaktight manner, thereby forming a bag, in particular after introducing products into the bag 1. According to a first variant, the second access opening 20 is closed by a closing surface 2, the closing surface 2 being adapted to attach to the wall of the bag 1 at its second access opening 20 (FIG. 1b). In essence, each point on the circumference of the closing surface 2 is fixed to a point on the circumference of the second access opening 20 of the bag 1, ideally in a one-to-one correspondence. According to a second variant, the second access opening 20 is closed by welding the wall of the bag 1 to itself at its second access opening 20 (FIG. 1*a*). Essentially all points on the circumference of the sealing surface 2 are welded together at ideally one point.

During use, the internal volume V of said bag 1 is filled with material to be introduced into the chamber 11, for example items such as syringe stoppers. The contents of the container thus formed are then sterilized with gamma irradiation for example.

Sterilization may for example take place through the wall 8 of the bag. A portion of the wall of the bag 1 may for example be of Tyvec® which is a vapor-permeable material. In this case, the bag is for example then enclosed in outside packaging to guarantee sterility until use. In the case where the second access opening 20 is closed by a closing surface, sterilization can be done through the closing surface 2 which may for example be of Tyvec®.

Figure 2:
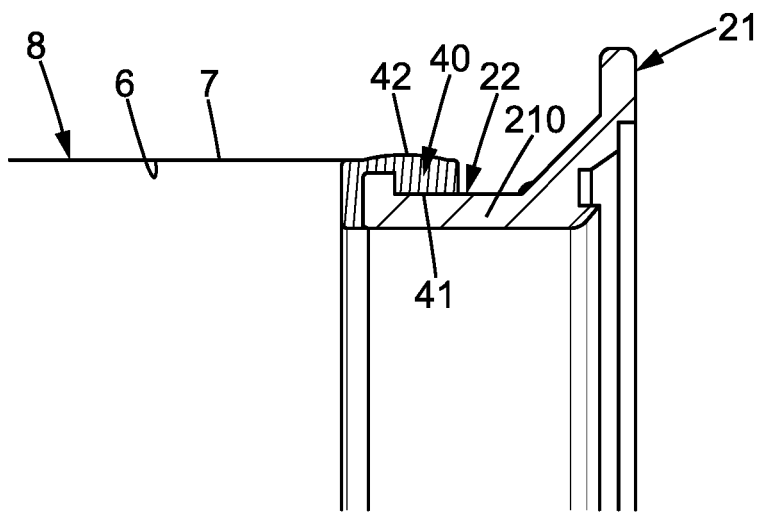
FIG. 2 illustrates a first embodiment of the assembly of the bag to the overmolding.

More specifically, in a first embodiment illustrated in FIG. 2, the connector 21 comprises a radially outer surface 22 facing radially outward of the connector 21, and the overmolding 40 comprises a radially inner surface 41 and a radially outer surface 42 opposite to the radially inner surface 41 of the overmolding 40. In addition, the bag 1 comprises an inner surface 6 facing towards the internal volume V. In the container thus formed, the radially outer surface 22 of the connector 21 is facing the radially inner surface 41 of the overmolding 40, such that during the step of positioning the overmolding 40 to face the wall of the bag 1, the radially outer surface 42 of the overmolding 40 is also positioned facing the inner surface 6 of the bag 1. Thus at the first access opening 10 of the bag 1, the passage between the bag 1 and the outside is composed of the superposition, from inside to outside, of the thickness of the connector 21 at its attachment portion, the thickness of the overmolding, and the thickness of the wall of the bag 1.

In particular, the wall 8 of the bag is of flexible film and is welded to the overmolding 40 in a closed continuous manner all along the first access opening 10.

Figure 3:
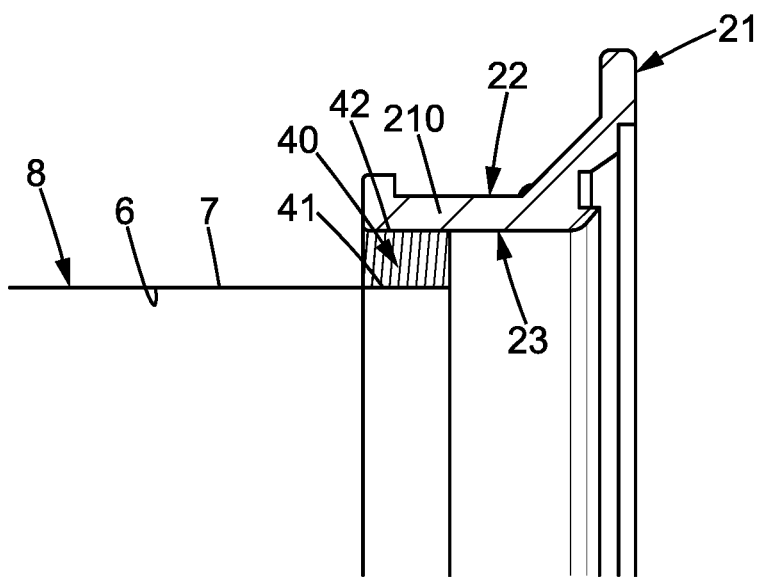
FIG. 3 illustrates a second embodiment of the assembly of the bag to the overmolding.

In another embodiment illustrated in FIG. 3, said connector 21 comprises a radially inner surface 23 facing radially inward of the connector 21, and the overmolding 40 comprises a radially inner surface 41 and a radially outer surface 42 opposite to the radially inner surface 41 of the overmolding 40. In addition, the bag 1 comprises an outer surface 7 opposite to the inner surface 6. In the container thus formed, the radially inner surface 23 of connector 21 is facing the radially outer surface 42 of the overmolding 40, such that during the step of positioning the overmolding 40 to face the wall 8 of the bag 1, the radially inner surface 41 of the overmolding 40 is positioned facing the outer surface 7 of the wall 8 of the bag 1. Thus at the first access opening of the bag 1, the passage between the bag 1 and the outside is composed of the superposition, from inside to outside, of the thickness of the wall of the bag 1, the thickness of the overmolding, and the thickness of the connector 21 at its attachment portion.

Figure 4:
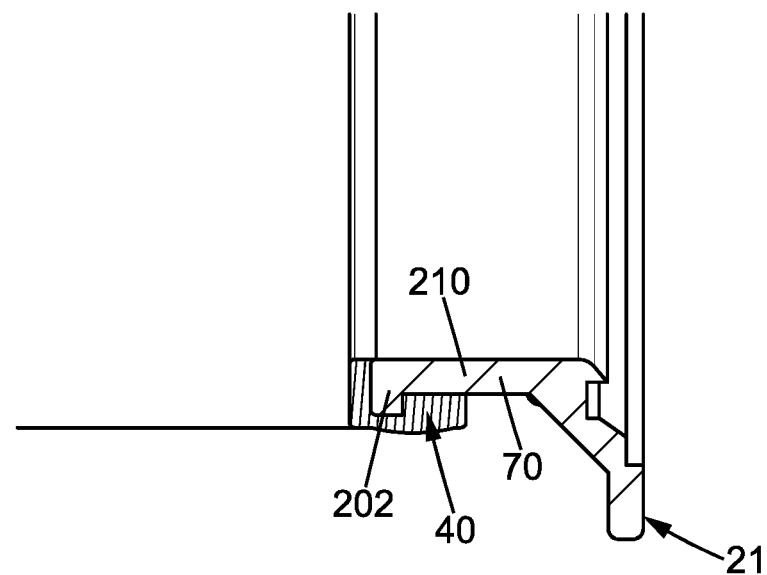
FIG. 4 illustrates the case of a projecting member at the attachment portion.

In particular, as illustrated in FIG. 4, the attachment portion 210 of the connector 21 may comprise a body 70 with a projecting member 202 which extends radially from said main body 70. Said projecting member 202 is adapted to be encapsulated in the overmolding 40. The thickness of the body at the projecting member 202 is typically two to three times greater than that of the body where there is no projecting member.

Figure 5:
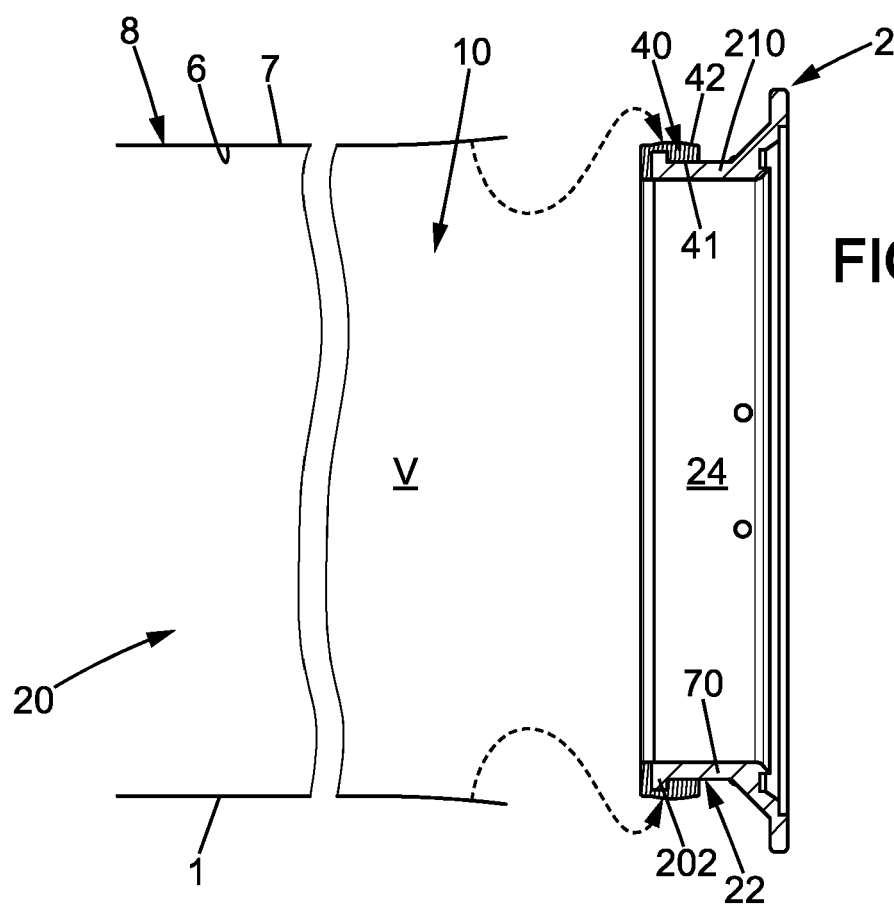
FIG. 5 illustrates the manufacture of a leaktight assembly.

The method for manufacturing the assembly, shown in FIG. 5, comprises the following steps in order:
positioning the wall of the bag 1 to face the overmolding 40 at the first access opening 10, the overmolding 40, carried by the connector 21, being for example inserted into the bag 1 by its access opening 10, in proximity to the access opening 10 of the bag 1,
welding the wall of the bag 1, at its first access opening, to the overmolding 40, in a closed continuous manner all along the first access opening.

Figure 6:
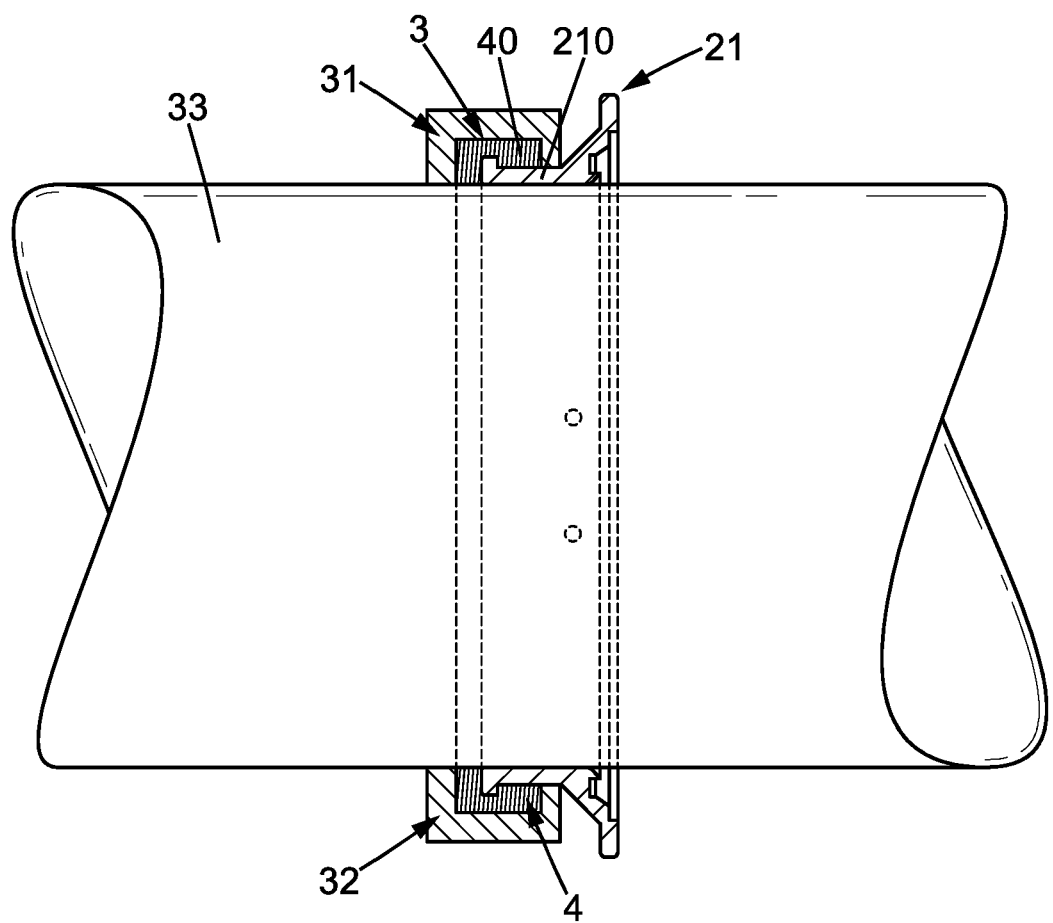
FIG. 6 illustrates the molding of the overmolding.

The manufacturing method also comprises a step of obtaining the overmolding 40, illustrated in FIG. 6. In this step of obtaining the overmolding 40, a molding member 3 adapted to at least partially surround the attachment portion 210 is provided. The molding member comprises for example two semi-circular cavities 31 and 32 and a tubular section 33 used to contain the material. Also provided is a molding product 4 in a material suitable for welding the wall of flexible film of the bag to said product.

The method includes at least the following three steps. First, the attachment portion 210 of the connector 21 is at least partially surrounded by the molding member 3 so as to define a closed cavity between the attachment portion 210 and the molding member 3. Next, the molding product 4 is poured or injected between the attachment portion 210 and the molding member 3. Lastly, the molding member 3 is removed, freeing the overmolding 40 over at least a portion of the attachment portion 210. The part 21 is obtained for example by injection molding using a molding member 3.

In the case where the attachment portion 210 of the connector is annular for example, the molding member 3 is also annular so that it surrounds the thickness of the connector 21 at its attachment portion 210. The overmolding 40 so obtained is then also annular. The weld is then a circular weld.

Such a manufacturing method will be used in particular for assembling a bag made of plastic film to a connector 21 made of polycarbonate (PC) or acrylonitrile butadiene styrene (ABS) or polyvinylidene fluoride (PVDF) or polybutylene terephthalate (PBT). Such materials for the connector 21 will be rigid so as to withstand the locking forces from the second connector and will be resistant to the various treatments associated with sterilization by steam (at temperatures below 125° C.), gamma irradiation, or ethylene oxide.

The plastic film may in particular be polyethylene (PE), high density polyethylene (HDPE), or low density polyethylene (LDPE).

The molding product 4 will then for example be of polyethylene (PE), high density polyethylene (HDPE), or in the form of thermoplastic elastomer (TPE), or may be of thermoplastic elastomer or polypropylene or polyvinylidene fluoride (PVDF). The overmolding 40 made of such materials provides poor resistance during sterilization (<125° C.) and will also tend to deform at welding working temperatures above 120° C., its mechanical strength being inadequate at these temperatures, but it will not melt during the temperature increase when it is mounted on the connector which will then "contain" its deformation. However, it has been demonstrated by tests that the welding of the plastic film on the overmolding has good resistance to gamma irradiation sterilization or steam sterilization.

To carry out the welding, the film and the overmolding begin to melt almost at the same time, therefore within similar temperature ranges of about 120° C. (far from the welding temperatures of the materials selected for the connector 21 which instead are about 200° C.).

We will advantageously consider the case where
the connector 21 is of polyvinylidene fluoride (PVDF) and the overmolding 40 is of high density polyethylene (HDPE) or thermoplastic elastomer (TPE);
the connector 21 is of polycarbonate (PC) and the overmolding 40 is of high density polyethylene (HDPE) or thermoplastic elastomer (TPE);
the connector 21 is of acrylonitrile butadiene styrene (ABS) and the overmolding 40 is of high density polyethylene (HDPE) or thermoplastic elastomer (TPE);
the connector 21 is of polybutylene terephthalate (PBT) and the overmolding 40 is of high density polyethylene (HDPE) or polyvinylidene fluoride (PVDF).

Figure 7:
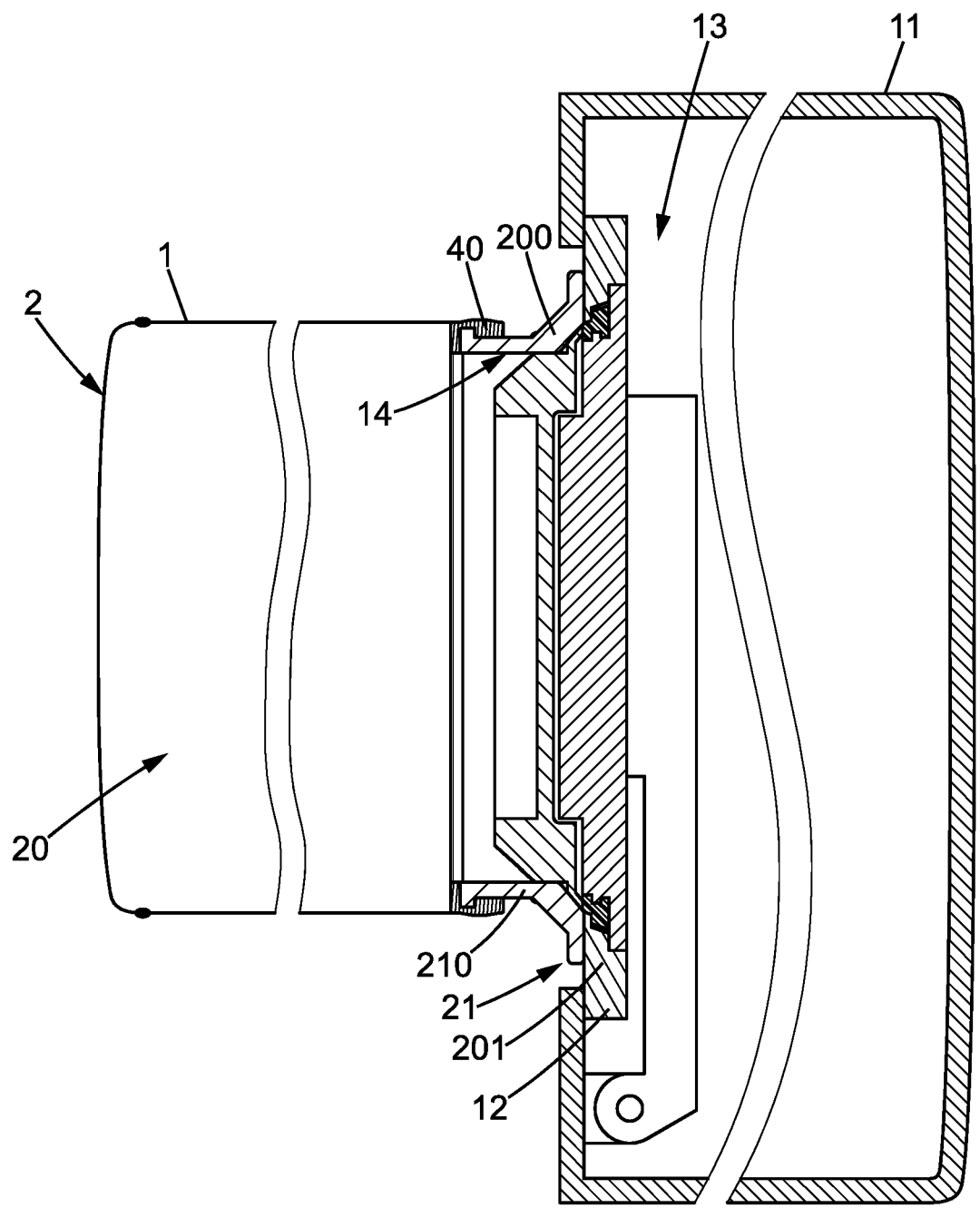
FIG. 7 shows the assembly between the container and an chamber by coupling intermediate doors.

In one particular embodiment illustrated in FIG. 7, the connector 21 comprises for example a first door 14 adapted for equipping the access opening 10 of the bag 1. The first door 14 comprises a flange-shaped frame 200, the attachment portion 210 forming at least a portion of the flange 200. Thus, the first door 14 can be used to close the container in a leaktight manner.

One can then form a leaktight assembly by assembling the leaktight container described above to an chamber 11. Such a temporary assembly may enable for example a clean transfer of biopharmaceutical content between the bag thus formed and the chamber 11.

The chamber 11 also comprises for example a second door 12, comprising a flange-shaped frame 201, said second door 12 being adapted for equipping an access opening 13 of said chamber 11 and being complementary to the first door 14.

Specifically, each door may be circular, the diametrical dimension of the second door 12 being greater than the dimension of the opening formed in the flange 200 for the first door. Each door is provided with sealing means with its flange, such as a compressible O-ring carried by the flange and engaging with a seat of said door. Each door is also associated with means for locking in the closed position on its flange. For positioning the flange 200 of the first door with respect to the flange 201 of the second door, the flange 201 of the second door is integral with a plurality of longitudinal fingers projecting outwards and able to engage with circular notches formed in the periphery of the flange 200 of the first door. In the absence of any transfer, each of the doors is locked to its flange. To transfer the contents of the bag to the chamber 11, the flange of the first door 200 is brought against that of the second door 201 where it is initially positioned by the fingers and then conclusively by engagement of a central boss of the second door in a recess of the first door. The two flanges are then locked together in the so-called coupled position, then the two doors are unlocked to allow communication between the bag and the chamber 11.

As an example, one of the chambers consists for example of an isolator and the bag contains one or more objects or a load to be transferred when in the coupled position, through the passage thus formed between the two chambers, for example to supply the clean room with items or products required for the fabrication or production underway in the clean room, or conversely to eliminate trash or products from said clean room. The bag may contain sterile objects, plugs, tubes, syringe plungers.

Figure 8:
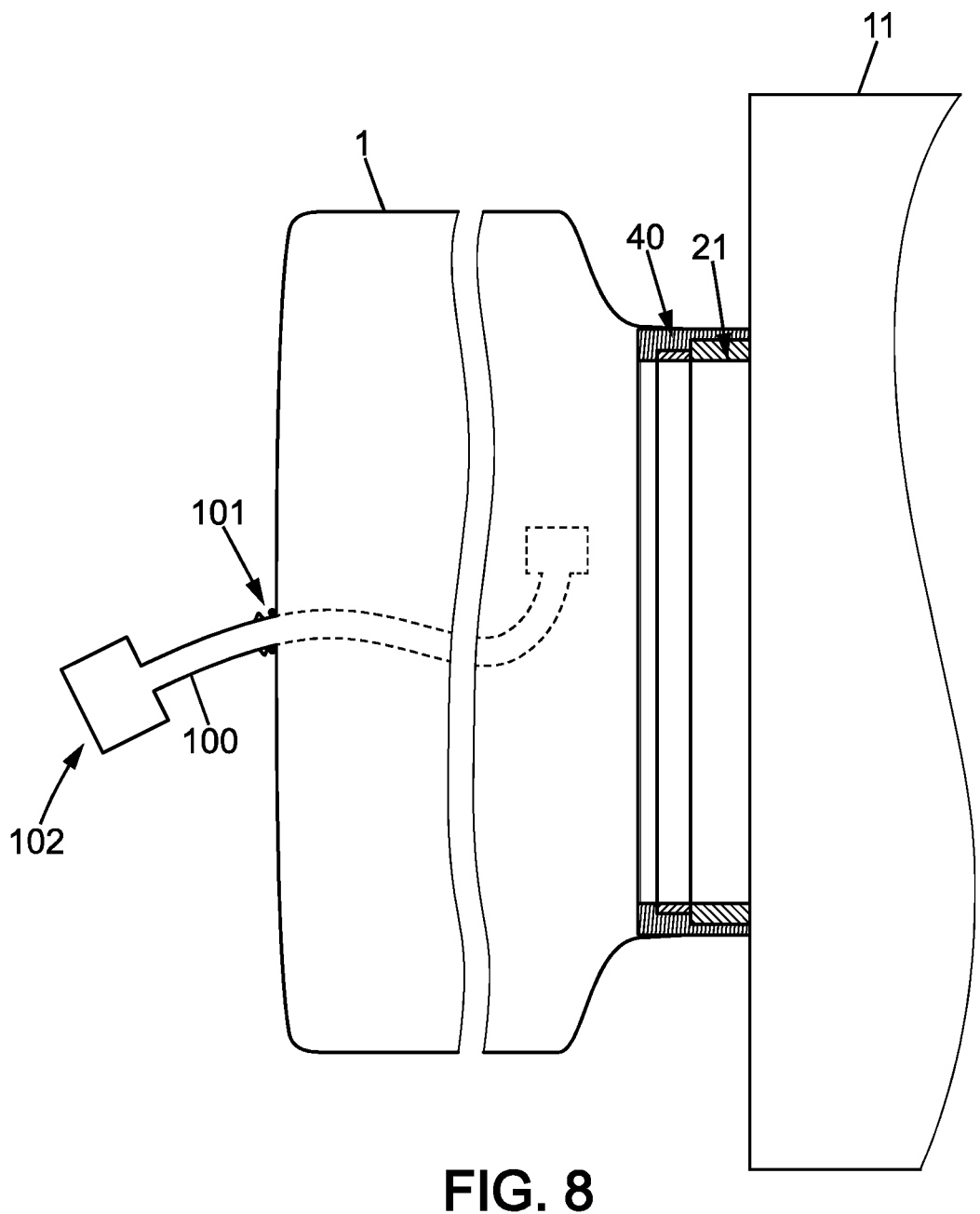
FIG. 8 illustrates the case of a container using a RAFT© bag In the different figures, the same references designate identical or similar elements.

The bag may be in particular a RAFT© bag as shown in FIG. 8. In this case, a hose 100 of an aseptic connector 102 passes aseptically through the wall 8 of the bag 1 and via a connector 101. Said tube 100 can thus then be inserted aseptically into the chamber 11 to form a sterile line between one end of the tube 100, through which products can be fed, and the chamber 11 to which the products can be conveyed.

In another particular embodiment, the overmolding is assembled to one side of the plastic film by adjusting the diameter of the hole to the elasticity of the film used, enabling an assembly of the connector referred to as flat assembly.

The invention claimed is:

1. A method for manufacturing a leaktight assembly, comprising:
   providing a bag that comprises a wall of flexible film, the wall of said bag defining an internal volume of said bag, said bag having two opposite ends, a first access opening at the first end adapted for placing the internal volume of the bag in communication with the outside of the bag, and a second access opening at the second end adapted for placing the internal volume of the bag in communication with the outside of the bag;
   providing a connection system that comprises a connector adapted for mechanical connection to a complementary connector of a sterile chamber in order to establish a sterile communication between the bag and the chamber, the connector comprising a portion for attachment to the bag, the connection system further comprising an overmolding molded over the attachment portion;
   positioning the wall of the bag facing the overmolding at the first access opening, the attachment portion surrounding a space for passage between the bag and the chamber at said first access opening; and
   welding the wall of the bag to the overmolding in a closed continuous manner all along the first access opening, wherein:
      said connector comprises a radially outer surface directed radially outward of the connector,
      the overmolding comprises a radially inner surface and a radially outer surface opposite to the radially inner surface of the overmolding,
      the bag comprises an inner surface facing towards the internal volume, and
      the radially outer surface of the connector facing the radially inner surface of the overmolding,
      such that during said positioning, the radially outer surface of the overmolding is also positioned facing the inner surface of the bag.

2. The method for manufacturing a leaktight assembly according to claim 1, further comprising:
   obtaining the overmolding, wherein:
      a molding member adapted to at least partially surround the attachment portion is provided, and
      a molding product suitable for welding the wall of flexible film of the bag to said product is provided;
      at least partially surrounding the attachment portion of the connector by the molding member so as to define a closed cavity between the attachment portion and the molding member;
      pouring the molding product into the cavity between the attachment portion and the molding member; and
      removing the molding member, freeing the overmolding over at least a portion of the attachment portion.

3. The method for manufacturing a leaktight assembly according to claim 1, wherein the connector is of polyvinylidene fluoride and the overmolding is of high density polyethylene or thermoplastic elastomer.

4. The method for manufacturing a leaktight assembly according to claim 1, wherein the connector is of polycarbonate and the overmolding is of high density polyethylene or thermoplastic elastomer.

5. The method for manufacturing a leaktight assembly according to claim 1, wherein the connector is of acrylonitrile butadiene styrene and the overmolding is of high density polyethylene or thermoplastic elastomer.

6. The method for manufacturing a leaktight assembly according to claim 1, wherein the connector is of polybutylene terephthalate and the overmolding is of high density polyethylene or polyvinylidene fluoride.

7. The method for manufacturing a leaktight assembly according to claim 1, wherein the wall of the bag is of plastic film.

8. The method Moth d for manufacturing a leaktight assembly according to claim 7, wherein the plastic film comprises a layer of polyethylene.

9. The method for manufacturing a leaktight assembly according to claim 8, wherein a layer of plastic film which faces the overmolding is a layer of polyethylene.

10. A method for manufacturing a leaktight container, comprising the method for manufacturing a leaktight assembly according to claim 1 and further comprising a step of filling the bag through the second access opening, and a step of closing the second access opening of the bag so as to close the bag in a leaktight manner at its second access opening after closing the assembly in a leaktight manner at the connector.

11. The method for manufacturing a leaktight container according to claim 10, wherein the closing step consists of welding the wall of the bag to itself at its second access opening.

12. A leaktight assembly, comprising:
a bag that comprises a wall of flexible film, the wall of said bag defining an internal volume of said bag, said bag having two opposite ends, a first access opening adapted for placing the internal volume of the bag in communication with the outside of the bag at the first end, and a second access opening adapted for placing the internal volume of the bag in communication with the outside of the bag at the second end; and
a connection system that comprises a connector adapted for mechanical connection to a complementary connector of a sterile chamber in order to establish a sterile communication between the bag and the chamber, the connector comprising a portion for attachment to the bag, the connection system further comprising an overmolding molded over the attachment portion,
the wall of the bag being positioned facing the overmolding at the first access opening, the attachment portion surrounding a space for passage between the bag and the chamber at the first access opening, and the wall of the bag being welded to the overmolding in a closed continuous manner all along the first access opening,
wherein:
said connector comprises a radially outer surface directed radially outward of the connector,
the overmolding comprises a radially inner surface and a radially outer surface opposite to the radially inner surface of the overmolding,
the bag comprises an inner surface facing towards the internal volume, and
the radially outer surface of the connector facing the radially inner surface of the overmolding,
such that when the overmolding is positioned facing the wall of the bag, the radially outer surface of the overmolding is also positioned facing the inner surface of the bag.

13. The leaktight assembly according to claim 12,
wherein the attachment portion has an annular shape, and
wherein the overmolding forms a ring around the attachment portion.

14. The leaktight assembly according to claim 12, wherein the connector comprises a door adapted to equip the first access opening of the bag, the door comprising a flange-shaped frame, the attachment portion being at least a portion of the flange.

15. A leaktight container comprising a leaktight assembly according to claim 12, the second access opening being closed in a leaktight manner.

16. The leaktight container according to claim 15, wherein the second access opening is closed by welding the wall of the bag to itself at its second access opening.

17. The leaktight assembly comprising a container according to claim 15, wherein the connector is a first connector, the leaktight assembly further comprising a rigid chamber comprising a second connector complementary to the first connector, the connector of the leaktight container being connected in a leaktight manner to the second connector of said rigid chamber.

18. A leaktight assembly, comprising:
a bag that comprises a wall of flexible film, the wall of said bag defining an internal volume of said bag, said bag having two opposite ends, a first access opening adapted for placing the internal volume of the bag in communication with the outside of the bag at the first end, and a second access opening adapted for placing the internal volume of the bag in communication with the outside of the bag at the second end; and
a connection system that comprises a connector adapted for mechanical connection to a complementary connector of a sterile chamber in order to establish a sterile communication between the bag and the chamber, the connector comprising a portion for attachment to the bag, the connection system further comprising an overmolding molded over the attachment portion,
the wall of the bag being positioned facing the overmolding at the first access opening, the attachment portion surrounding a space for passage between the bag and the chamber at the first access opening, and the wall of the bag being welded to the overmolding in a closed continuous manner all along the first access opening,
wherein the attachment portion of the connector comprises a body and a projecting member, the projecting member extending radially from said body, said projecting member being encapsulated in the overmolding.

* * * * *